(12) United States Patent
Kawakita et al.

(10) Patent No.: US 11,290,189 B2
(45) Date of Patent: Mar. 29, 2022

(54) OPTICAL COMMUNICATION SYSTEM AND OPTICAL COMMUNICATION METHOD

(71) Applicant: NIPPON TELEGRAPH AND TELEPHONE CORPORATION, Tokyo (JP)

(72) Inventors: Atsuko Kawakita, Musashino (JP); Kazutaka Hara, Musashino (JP); Hiroyuki Furukawa, Musashino (JP); Yasutaka Kimura, Musashino (JP); Kenji Horikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/271,222

(22) PCT Filed: Aug. 21, 2019

(86) PCT No.: PCT/JP2019/032611
§ 371 (c)(1),
(2) Date: Feb. 25, 2021

(87) PCT Pub. No.: WO2020/045185
PCT Pub. Date: Mar. 5, 2020

(65) Prior Publication Data
US 2021/0194589 A1    Jun. 24, 2021

(30) Foreign Application Priority Data
Aug. 27, 2018 (JP) .............................. JP2018-158170

(51) Int. Cl.
*H04J 14/00* (2006.01)
*H04B 10/272* (2013.01)
(Continued)

(52) U.S. Cl.
CPC .......... *H04B 10/272* (2013.01); *G02B 6/272* (2013.01); *H04L 12/44* (2013.01)

(58) Field of Classification Search
CPC .............................. G02B 6/272; G02B 6/125; G02B 2006/1215; G02B 2006/12154;
(Continued)

(56) References Cited

U.S. PATENT DOCUMENTS

2002/0110315 A1    8/2002  Redmond
2009/0304332 A1    12/2009 Schweiker
(Continued)

FOREIGN PATENT DOCUMENTS

JP    2003234721 A    8/2003
JP    2007102060 A    4/2007

*Primary Examiner* — Hibret A Woldekidan

(57) ABSTRACT

To provide an optical communication system and an optical communication method able to achieve a high reliable access network capable of long haul distance transmission considering the optical energy efficiency even if the user distribution is biased. An uneven branch optical splitter included in an optical communication system according to the present invention can output the optical intensities different for each output port by adjusting the branching configuration and the branching ratio. For example, a reach transmission distance of the farmost user can be extended or the number of connectible users can be increased by adjusting the branching configuration of the uneven branch optical splitter or the branching ratios such that the near minimum reception sensitivity is given for the ONU installed near the telecommunications carrier.

8 Claims, 8 Drawing Sheets

(51) Int. Cl.
*G02B 6/27* (2006.01)
*H04L 12/44* (2006.01)

(58) Field of Classification Search
CPC ............... H04J 14/0282; H04J 14/0246; H04J 14/0247; H04L 12/44; H04B 10/272; H04B 10/27; H04Q 11/0067; H04Q 2011/0086
USPC ........................................ 398/66–72, 61, 63
See application file for complete search history.

(56) References Cited

U.S. PATENT DOCUMENTS

2012/0237161 A1\* 9/2012 Ross ........................ G02B 6/30
 385/24
2015/0270895 A1\* 9/2015 Fink .................... H04J 14/0227
 398/16

\* cited by examiner

| FIRST STAGE OPTICAL SPLITTER PORT NUMBER | SECOND STAGE OPTICAL SPLITTER PORT NUMBER | ONU CONNECTION STATE | DISTANCE (km) |
|---|---|---|---|
| PORT 2 | 1 | Active | l1 |
|  | 2 | Active | l2 |
|  | . |  |  |
|  | 8 | Negative | - |
| PORT 3 | 1 | Negative | - |
|  | 2 | Active | l3 |
|  | . |  |  |
|  | 8 | Active | l4 |
| PORT 4 | 1 | Active | l5 |
|  | 2 | Active | l6 |
|  | . |  |  |
|  | 8 | Active | l7 |

| BRANCHING RATIO X (%) | Lx, Ly, Lz (um) | VOLTAGE (V) |
|---|---|---|
| 50 | 1.01 | 1.2 |
| 51 | 1.05 | 1.3 |
| 52 | 1.02 | 1.4 |
| 53 | 1.00 | 1.5 |
| ⋮ | ⋮ | ⋮ |
| 99 | 0.64 | 2.8 |

Fig. 14

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2019/032611, filed on Aug. 21, 2019, which claims priority to Japanese Application No. 2018-158170 filed on Aug. 27, 2018. The entire disclosures of the above applications are incorporated herein by reference.

TECHNICAL FIELD

The disclosure relates to an optical communication system and an optical communication method.

BACKGROUND ART

With the explosive spread of the Internet, the number of subscribers to the Fiber to the home (FTTH) providing a high-speed communication service has increased. The current FTTH service utilizes a gigabit-ethernet passive optical network (1G-EPON) at a communication speed of 1 Gbit/s, but is required to provide, in the future, further wider bandwidth for addressing the increased number of subscribers due to further spread of the Internet, a backhaul line for the fifth generation mobile communication system, the application to the Internet of Things (IoT), a distribution service of 4K/8K high-definition video, and the like. Currently, for these requirements, a study has been actively made by the standardization organizations such as IEEE and ITU, regarding 10G-EPON that has already been standardized, 40 Gbit/s-class PON (ITU-T Rec G. 989 series) and even 100 Gbit/s-class next-generation PON systems (IEEE 802.3 ca).

In general, in FTTH services, a time division multiplexing PON (TDM-PON) system is introduced on the basis of a time division multiplexing (TDM) technology as a multiplexing technique and a double star type as a network topology to efficiently and economically accommodate subscribers deployed in a plane. FIG. 1 illustrates a typical double star PON system. In FIG. 1, a reference sign 100 denotes a telecommunications carrier station; 101, an optical line termination (OLT) installed in an accommodating station; 102, an m:1 optical splitter at the first stage; 103, a primary subscriber optical fiber line to an area 2; 104, an n:1 optical splitter at the second stage to the area 2; 105, n branched subscriber optical fiber lines; and 106-1 to 106-$n$, n terminals (optical network units (ONUs)) installed in subscribers homes in the area 2. With a configuration in which a plurality of user devices (ONUs) are connected to one station terminal (OLT), devices and fibers are shared by the plurality of users and the first stage m:1 optical splitter 102 is used so that efficient accommodating in another area and an economical FTTH service can be achieved.

Because of characteristics of a network architecture in the PON system, an optical intensity of a transmitted optical signal is evenly divided by the optical splitter that is installed at the connection point between the primary subscriber optical fiber line and the branched subscriber optical fiber lines. In a branching configuration of the optical splitter, for example, if the number of subscribers in the areas 1 to 4 in FIG. 1 is 32 with m=4 and n=8, the optical intensity of light output from the OLT becomes ⅓₂ or less due to a branching loss by 4-branch and 8-branch optical splitters and a transmission line loss caused by the fibers, and such light arrives each ONU. In this way, owing to the branching loss by the optical splitters, a connection loss due to connector connection, and the transmission line loss due to optical fibers, the PON system requires an optical power budget exceeding the above losses to establish communication between the OLT and ONUs. In general, a larger optical power budget allows a longer haul distance, and in recent years there is a demand for device cost reduction per user, power reduction due to station integration, and the like derived from reduction in the number of devices due to area expansion caused by the longer haul distance.

CITATION LIST

Patent Literature

Patent Literature (PTL) 1: JP 2007-102060 A

SUMMARY OF THE INVENTION

Technical Problem

There are two factors that inhibit the longer haul distance of the network:
i) Attenuation of optical intensity; and
ii) Waveform distortion due to wavelength dispersion. For the longer haul distance in the FTTH service, i.e., the access network, since a transmission distance is approximately 100 km or less, by using a LD (Laser Diode) with a narrow spectral line width, such as a Distributed Feed Back (DFB)-LD, for a LD mounted on the OLT/ONU, the effect of wavelength dispersion of ii) is nearly neglected, and the attenuation of the optical intensity of i) is to be the main factor.

The simplest approach to the problem of attenuation of the optical intensity of i) described above is a technique in which an attenuated light is recovered by using a semiconductor optical amplifier (SOA) or a rare earth doped optical fiber amplifier. For example, the SOA may be utilized to achieve 80 km and 128-branch multi-branching/longer haul distance. However, both the SOA and the rare earth doped optical fiber amplifier are direct amplifiers of the optical signal according to the principle of induced emission, and thus, require a current source, which may lead to a reduction in Mean Time Between Failures (MTBF) throughout the system due to ensuring a power supply and the use of active elements.

Moreover, it is known that the user distribution in the access network is a $\chi^2$ distribution rather than a uniform distribution around the telecommunications carrier station. This means that a user density near the telecommunications carrier station is high and a population density of the remote users is sparse, and if a conventional passive double star PON system is applied to this distribution, the efficiency of optical energy exchanged between the OLT and the ONUs is disadvantageously low.

The reason for this will be described using FIG. 2. FIG. 2 illustrates a level diagram in a passive double star PON system taking into account a down direction loss in between the OLT and ONUs. Some reference signs in the figure are the same as those illustrated in FIG. 1. A reference sign 106-$n$ in the figure denotes an ONU installed at a farmost users home in the area 2; 107-$n$, an ONU installed at a near user s home in the area 1; 1A, an optical signal output from the OLT (an optical intensity of which is Pin); 2A, an optical intensity after transmission from the OLT to the first stage m:1 optical splitter 102; 3A, an optical intensity after branching by the m:1 optical splitter 102; 4A, an optical intensity after reaching the n:1 optical splitter 104-1 installed in the area 1; 5A, an optical intensity after branching by the n:1 optical splitter 104-1; 6A, a received optical intensity at the ONU (denoted by a reference sign 107-*n*) installed in the area 1; 7A, an optical intensity after reaching the n:1 optical splitter 104-2 installed in the area 1; 8A, an optical intensity after branching by the n:1 optical splitter 104-2; and 9A, a received optical intensity at the ONU (denoted by a reference sign 106-*n*) installed in the area 2. At this time, the optical power budgets required by the ONUs 106-*n* and 107-*n* can be expressed as:

ONU(106-*n*)=Pin−9*A* and

ONU(107-*n*)=Pin−6*A*.

The PON system is system-designed such that a level of the received optical intensity at the ONU that is installed the farthest is not less than the minimum reception sensitivity Prec because the distances between the OLT and the ONUs are different as described above. As such, the ONU 107-*n* will receive an excess energy, an optical power budget difference of 6 A–9 A.

As described above, the optical energy efficiency is difficult to optimize in the conventional PON systems in terms of its structure in a case that the user distribution is biased, and when attempting to utilize an optical amplifier, the ensured power supply and network reliability may be decreased. That is, there has been a problem with the conventional PON systems in which it is difficult to achieve a high reliable access network capable of long haul distance transmission considering the optical energy efficiency even if the user distribution is biased.

Therefore, in order to solve the problems described above, an object of the present invention is to provide an optical communication system and an optical communication method able to achieve a high reliable access network capable of long haul distance transmission considering the optical energy efficiency even if the user distribution is biased.

Means for Solving the Problem

In order to achieve the above object, the optical communication system according to the present invention uses an uneven branch type of optical splitter as the optical splitter used in the PON system.

An optical communication system according to the present invention is an optical communication system including one OLT and a plurality of ONUs connected via one trunk optical splitter located on a trunk optical fiber connected to the OLT,
wherein the one trunk optical splitter is an uneven branch optical splitter that branches a light from one wave coupling port on a wave coupling side to a plurality of branch ports on a branching side at a predetermined branching ratio, and
a branch port, where the number of branch points from the wave coupling port to the branch port is minimum, among the branch ports of the uneven branch optical splitter, is connected to a farmost ONU.

An optical communication method according to the present invention is an optical communication method in an optical communication system in which one OLT and a plurality of ONUs are connected via at least one trunk optical splitter located on a trunk optical fiber connected to the OLT, the optical communication method including:
using the one trunk optical splitter as an uneven branch optical splitter that branches a light from one wave coupling port on a wave coupling side to a plurality of branch ports on a branching side at a predetermined branching ratio, and connecting a branch port, where the number of branch points from the wave coupling port to the branch port is minimum, among the branch ports of the uneven branch optical splitter to a farmost ONU.

In the m:1 optical splitter 102 and the n:1 optical splitter 104 utilized in a conventional PON system, the optical intensities evenly split into m or n are output from the output ports. On the other hand, the uneven branch optical splitter included in the optical communication system according to the present invention can output the optical intensities different for each output port by adjusting the branching configuration and the branching ratio. For example, a reach transmission distance of the farmost user can be extended or the number of connectible users can be increased by adjusting the branching configuration of the uneven branch optical splitter or the branching ratios such that the near minimum reception sensitivity is given for the ONU installed near the telecommunications carrier. That is, by adjusting the uneven branch optical splitter to output the different optical intensities to each output port depending on the bias of the user distribution, the optical energy efficiency can be optimized and the long haul transmission is enabled without the use of optical amplifiers.

As such, the present invention can provide an optical communication system and an optical communication method able to achieve a high reliable access network capable of long haul distance transmission considering the optical energy efficiency even if the user distribution is biased.

An example of the optical communication system according to the present invention is an optical communication system including one OLT and a plurality of ONUs connected via two or more optical splitters,
wherein the optical splitters include
at least one trunk optical splitter located in a trunk optical fiber connected to the OLT,
a plurality of branch optical splitters located on branch optical fibers branched from the trunk optical fiber by the at least one trunk optical splitter, and
a trunk end optical splitter located at a far end of the trunk optical fiber when viewed from the OLT,
one of the at least one trunk optical splitter is an uneven branch optical splitter that branches a light from one wave coupling port on a wave coupling side to a plurality of branch ports on a branching side at a predetermined branching ratio,
a branch port, where the number of branch points from the wave coupling port to the branch port is minimum, among the branch ports of the uneven branch optical splitter is connected to the trunk optical fiber, and
the branch optical splitters, the trunk end optical splitter, and the others of the at least one trunk optical splitter are even branch optical splitters each of which equally branches a light from one wave coupling port on the wave coupling side to a plurality of branch ports on the branching side.

As an example of the optical communication system according to the present invention, the at least one trunk optical splitter is only one trunk optical splitter, which is located the nearest to the OLT and on the trunk optical fiber, the number of branch ports of the only one trunk optical splitter is m (m is an integer of 2 or greater),
a branch port, where the number of branch points from the wave coupling port to the branch port is minimum, among the branch ports of the uneven branch optical splitter that is the only one trunk optical splitter is connected to a wave coupling port of the trunk end optical splitter having branch ports the number of which is n (n is an integer of 2 or greater), other than the branch port, where the number of branch points from the wave coupling port to the branch port is minimum, among the branch ports of the uneven branch optical splitter that is the only one trunk optical splitter, a wave coupling port of the branch optical splitter having branch ports the number of which is n (n is an integer of 2 or greater) is connected, and the optical communication system is a passive double star optical communication system.

Here, the uneven branch optical splitter in the optical communication system according to the present invention is preferably configured with the predetermined branching ratio for each of the branch optical splitters connected to the branch ports of the uneven branch optical splitter via the branch optical fibers such that a light from a farmost ONU that is the farthest from the OLT, among the ONUs under the branch optical splitter, arrives at the OLT with an optical intensity at a minimum reception sensitivity or more of the OLT.

The uneven branch optical splitter in the optical communication system according to the present invention has a variable mechanism that changes the branching ratio with a control signal, and the optical communication system further includes a branching ratio determining unit including a calculation device configured to calculate the branching ratio of the uneven branch optical splitter based on a distance to the farmost ONU for each branch optical splitter, the distance being measured by a ranging function of the OLT, and a configuration information transmission unit configured to notify the uneven branch optical splitter, through the control signal, of the branching ratio calculated by the calculation device as the predetermined branching ratio.

The user distribution variation after setting the communication system can be addressed.

Effects of the Invention

The present invention can provide an optical communication system and an optical communication method able to achieve a high reliable access network capable of long haul distance transmission considering the optical energy efficiency even if the user distribution is biased.

BRIEF DESCRIPTION OF DRAWINGS

FIG. 14 is a diagram illustrating a table stored in a splitter configuration information database included in the optical communication system according to an embodiment of the present disclosure.

DESCRIPTION OF EMBODIMENTS

Hereinafter, embodiments of the present disclosure will be described with reference to the drawings. The embodiments described below are examples of the present disclosure, and the present disclosure is not limited to the following embodiments. In this specification and the drawings, constituent elements having the identical reference signs are assumed to be the same.

Embodiment 1

The present embodiment will be described using FIGS. 3, 4, and 5.

Figure 1:
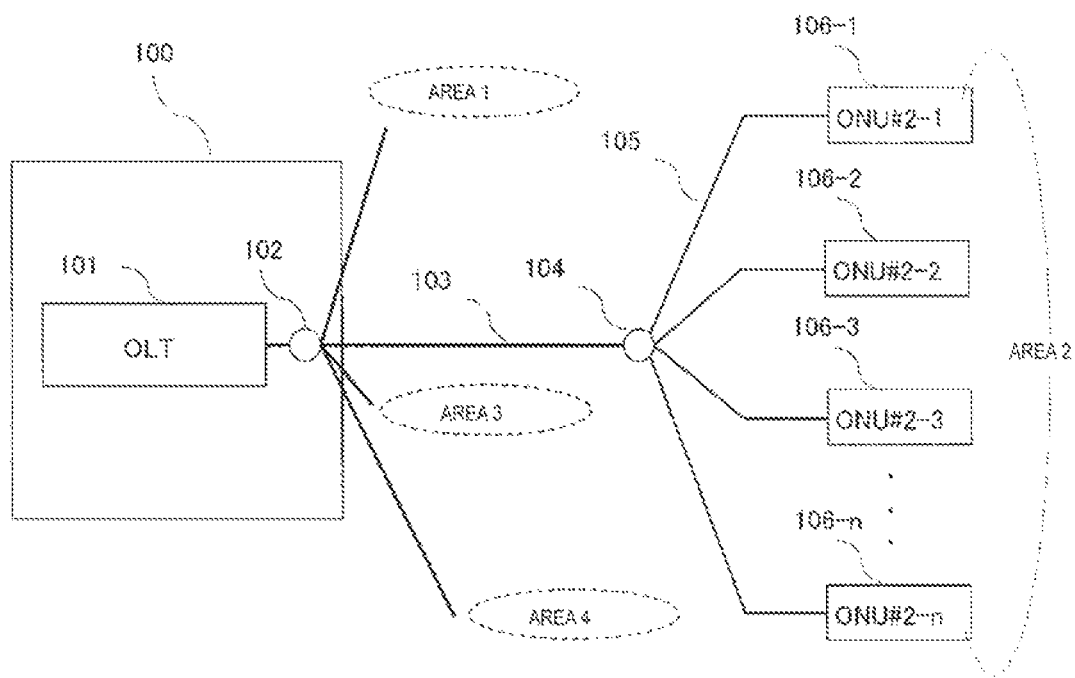
FIG. 1 is a diagram illustrating a double star PON system.
Figure 2:
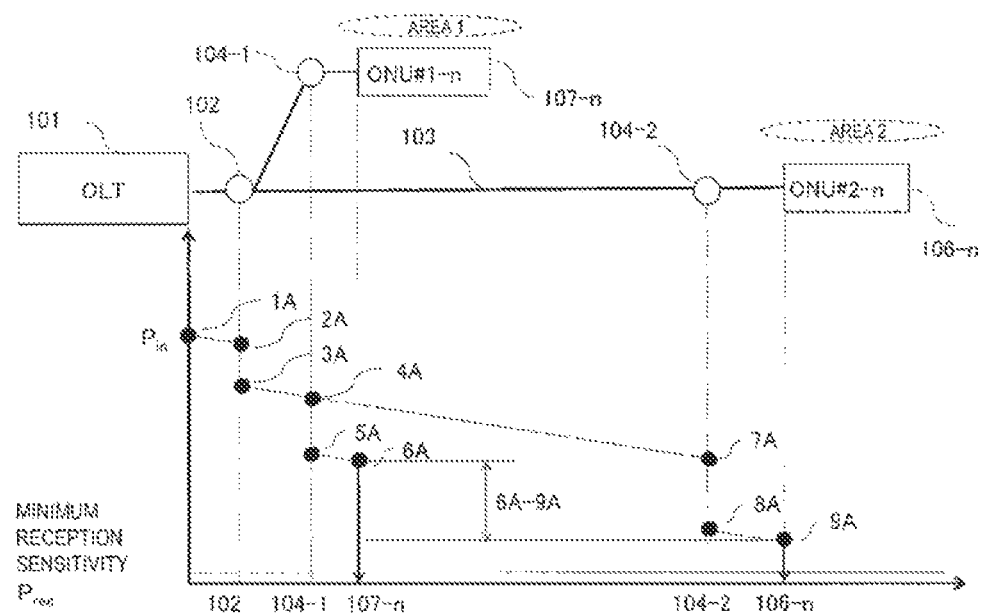
FIG. 2 is a diagram illustrating a level diagram of a PON system.
Figure 3:
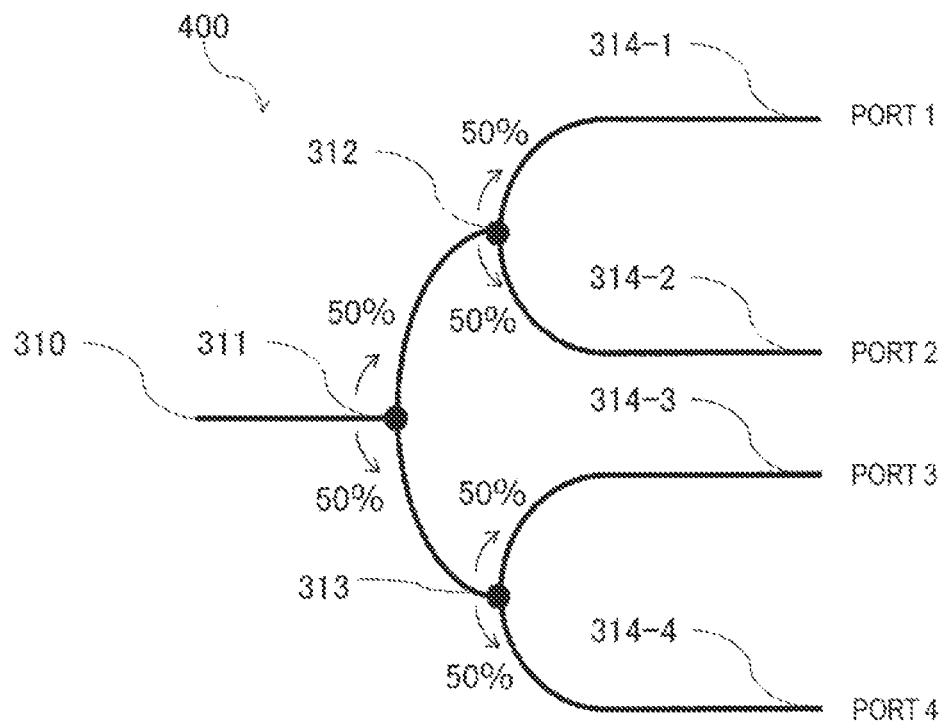
FIG. 3 is a diagram illustrating a configuration of an even branch/distribution 4-branch optical splitter.
Figure 4:
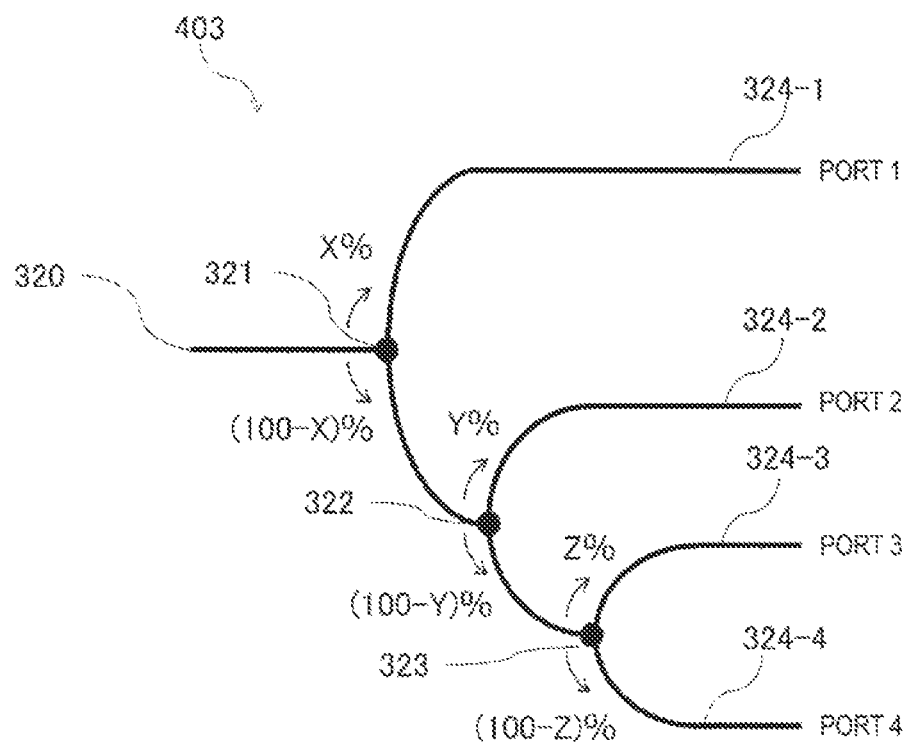
FIG. 4 is a diagram illustrating a configuration of an uneven branch/distribution 4-branch optical splitter.
Figure 5:
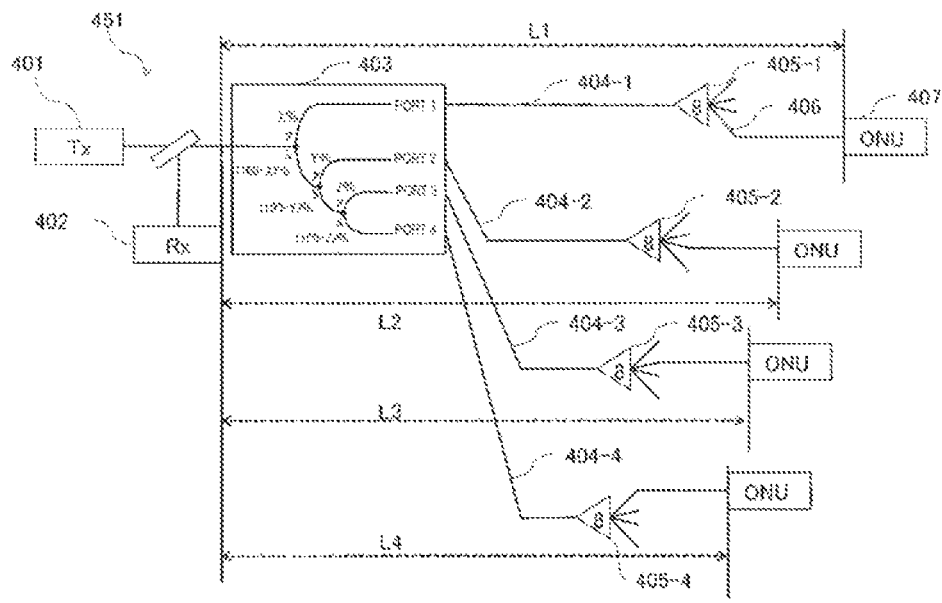
FIG. 5 is a diagram illustrating an optical communication system according to an embodiment of the present disclosure.

FIGS. 3 and 4 illustrate configurations of a conventional fiber type even branch/distribution 4-branch optical splitter 400 and an uneven branch/distribution 4-branch optical splitter 403 in the present invention, respectively. Optical splitters are broadly divided into a fiber type optical splitter in which a plurality of optical fiber cores are fused and extended to weaken an optical confinement effect in the cores to couple a light to an adjacent fiber, and a waveguide type optical splitter in which an optical circuit is formed on a quartz glass or silicon substrate by use of a semiconductor processing technology such as photolithography on quartz glass or silicon substrate.

A reference sign 310 in FIG. 3 denotes an input port of a light; 311 to 313, branch points (fiber fused and extended points); and 314-1 to 314-4, output ports of an even branch/distribution 4-branch optical splitter. A branching ratio at each of the branch points (denoted by the reference signs 311 to 313) is 50:50(%) because of even distribution. In a case of the configuration of FIG. 3, a light incident on the input port (denoted by the reference sign 310) is output to the ports 1 to 4 at an optical intensity of one fourth of the incident light.

On the other hand, a reference sign 320 in FIG. 4 denotes an input port of a light; 321 to 323, branch points (fiber fused and extended points); and 324-1 to 324-4, output ports of an uneven branch/distribution 4-branch splitter. Branching ratios at the branch points 321 to 323 are X:100−X (%), Y:100−Y (%), and Z:100−Z (%), respectively, and X, Y, and Z are greater than 0%. Focusing on the port 1, in the uneven branch/distribution 4-branch optical splitter in FIG. 4, there is one branch point 321, but in the even branch/distribution 4-branch optical splitter in FIG. 3, the light is branched at two branch points 311 and 312, and thus, the loss due to branching is from one fourth to one half assuming that the branching ratio X of the uneven branch/distribution splitter is X=50%.

Specifically, the optical communication system of the present embodiment is an optical communication system including one OLT and a plurality of ONUS connected via one trunk optical splitter located on a trunk optical fiber connected to the OLT, the one trunk optical splitter is an uneven branch optical splitter 403 that branches a light from one wave coupling port 320 on a wave coupling side to a plurality of branch ports 324 on a branching side at a predetermined branching ratio, and the branch port 324-1, where the number of branch points from the wave coupling port 320 to the branch port 324 is minimum, among the branch ports 324 of the uneven branch optical splitter 403 is connected to a farmost ONU.

By changing a branching configuration and the branching ratio as illustrated in FIG. 4, and connecting a user terminal at the farthest location among the total number of accommodated users to the port 1, it is made possible to devote a share corresponding to the branching loss to the fiber transmission line loss in comparison to the even branch/distribution optical splitter illustrated in FIG. 3, i.e., the longer haul distance is possible (by 3 dB in the case of X=50%). If the branching ratio X satisfies X>50(%), it is possible to devote a share corresponding to the branching loss of 3 dB or more to the fiber transmission line loss, and further longer haul distance of the port 1 can be achieved. On the other hand, depending on the value of the branching ratio X, a downlink signal light output from the OLT may be less than or equal to the minimum reception sensitivity of a receiver on the ONU side disposed under the port 2 to port 4, or an uplink signal light output from each ONU may be less than or equal to the minimum reception sensitivity of a receiver on the OLT side, and a communication interruption may occur.

That is, in order to establish communication between the OLT and the all ONUs, an optical power budget is required to exceed the branching loss of the optical splitter and the fiber transmission line loss. The most energy efficient way between the OLT and the ONUs is that the light output from each ONU arrives with the optical intensity at the minimum reception sensitivity of the receiver of the OLT.

As described above, the uneven branch/distribution 4-branch optical splitter 403 can establish the communication with the all ONUs under the OLT and achieve the longer haul distance of the port 1 by determining the branching ratios X, Y, and Z of the optical splitter such that each of the lights output from a farmost ONU connected under the port 2, a farmost ONU connected under the port 3, and a farmost ONU connected under the port 4 arrives with the optical intensity at the minimum reception sensitivity of the receiver of the OLT side.

Next, a method for determining the branching ratios X, Y, and Z of the uneven branch/distribution 4-branch optical splitter 403 is described. FIG. 5 illustrates an optical communication system 451 in case that an uneven branch/distribution optical splitter with m=4 in a first stage m:1 optical splitter. A reference sign 401 in the figure denotes a transmitter in the OLT; 402, a receiver in the OLT; 403, the uneven branch/distribution 4-branch optical splitter in FIGS. 4; 404-1 to 404-4, primary subscriber optical fiber lines; 405-1 to 405-4, second stage n:1 optical splitters (n=8); 406, eight branched subscriber optical fiber lines; and 407, an ONU located under each port the farthest from the telecommunications carrier station. Assume that distances from the OLT receiver (denoted by the reference sign 402) to the farmost ONUs (denoted by the reference numeral 407) connected to the respective ports are L1 to L4 [km], a minimum reception sensitivity of an OLT receiver (denoted by the reference sign 402) is $P_{rec}$ [dBm], an intensity of an output light from the ONU is $P_{onu}$ [dBm], a fiber transmission loss is a [dB/km], a branching loss of each of the 8-branch optical splitters (denoted by the reference signs 405-1 to 405-4) is A [dB], and other loss including a fiber connection loss and the like is B [dB]. An approach in which the output optical intensity ($P_{onu}$) of the ONU is changed depending on the transmission distance is considered, but because the distances between the OLT and the ONUs are different from each other, the total ONU is the same light output $P_{onu}$ in the present invention.

Based on the distance L2 [km] to the farmost ONU under the port 2, the distance L3 [km] to the farmost ONU under the port 3, and the distance L4 [km] to the farmost ONU under the port 4, X, Y, and Z are set such that the lights output from the farmost ONU under port 2, the farmost ONU under port 3, and the farmost ONU under port 4 give $P_{rec}+\Delta P$ in the OLT receiver (denoted by the reference sign 402), and thus the port 1 can extend the transmissible distance. Here, $\Delta P$ represents a margin that takes into account light output reduction due to aging of a LD placed within the ONU, light output fluctuation due to current instability of a LD driver, light output fluctuation of the LD due to an optical feedback in the optical splitter or fiber connection points (Fresnel reflection with refractive index changes), and other optical intensity fluctuations. Although it is most energy efficient for the light from the farmost ONU to arrive with the minimum reception sensitivity of the receiver of the OLT, the minimum reception sensitivity ($P_{rec}$)+$\Delta P$ may prevent the optical intensity of the light arriving at the OLT from being less than $P_{rec}$ even when the optical intensity fluctuations described above occur. $\Delta P$ is 10% of $P_{rec}$, for example. Note that the $\Delta P$ is preferably set appropriately between 0 to 10% of $P_{rec}$ depending on the configuration of the communication system.

Under the conditions described above, the following equations holds for the optical intensities when the lights output from the farmost ONU under the port 2, the farmost ONU under the port 3, and the farmost ONU under the port 4 arrive at the OLT. The right sides of equations (1) to (3) are the minimum reception sensitivities $P_{rec}+\Delta P$.

[Math. 1]

$$P_{onu}-A+10\{\log_{10}[(100-X)Y]-4\}-\alpha L_2-B-P_{rec}+\Delta P \tag{1}$$

[Math. 2]

$$P_{onu}-A+10\{\log_{10}[(100-X)(100-Y)Z]-6\}-\alpha L_3-B=P_{rec}+\Delta P \tag{2}$$

[Math. 3]

$$P_{onu}-A+10\{\log_{10}[(100-X)(100-Y)(100-Z)]-6\}-\alpha L_4-B=P_{rec}+\Delta P \tag{3}$$

X, Y, and Z are solved by equations (1), (2), and (3):

[Math. 4]

$$X = 10^2[1-\{10^{(\alpha L_2-C)/10}+10^{(\alpha L_3-C)/10}+10^{(\alpha L_4-C)/10}\}] \tag{4}$$

-continued

[Math. 5]
$$Y = 10^2 \left( \frac{10^{\alpha L_2/10}}{10^{\alpha L_2/10} + 10^{\alpha L_3/10} + 10^{\alpha L_4/10}} \right) \quad (5)$$

[Math. 6]
$$Z = 10^2 \left( \frac{10^{\alpha L_3/10}}{10^{\alpha L_3/10} + 10^{\alpha L_4/10}} \right) \quad (6)$$

[Math. 7]

Where $C \equiv P_{onu} - (P_{rec} + \Delta P) - A - B \quad (7)$

Where $P_{onu}$ or $P_{rec}$ has a value defined by standardization, for example, from the IEEE Std 802.3 (trade name)-2012, and all of ΔP (a margin from the minimum reception sensitivity of the receiver on the OLT side), A (8-branch optical splitter branching loss), and B (connector connection loss, excessive loss of splitter, etc.) are constants, and thus, it can be seen that equation (7) gives a constant.

On the other hand, the following equation holds for the optical intensity when the light output from the farmost ONU under the port 1 arrives at the OLT:

[Math. 8]

$$P_{onu} - A + 10(\log_{10} X - 2) - \alpha L_1 - B = P_{rec} + \Delta P \quad (8)$$

Substitute equation (4) into equation (8) and solve $L_1$ to obtain:

[Equation 9]

$$L_1 = \frac{1}{\alpha} \{10 \log_{10}[1 - (10^{(\alpha L_2 - C)/10} + 10^{(\alpha L_3 - C)/10} + 10^{(\alpha L_4 - C)/10})] + C\} \quad (9)$$

The fiber transmission loss α [dB/km] on the right side of equation (9) has a different value depending on the wavelength used, but is a constant 0.5 dB/km at 1.3 μm band or 0.25 dB/km at 1.5 μm band, for example. Transmission distances L2 to L4 can be measured by a PON ranging function measuring a Round Trip Time (RTT) from a clock within the OLT. As such, equation (8) was a function of the branching ratio X, but the conversion to the distances (L2 to L4) to the respective farmost ONUs connected under the ports 2 to 4 enables every term to be given as a constant, which allows the distance to be calculated.

On the other hand, for the port 1 of the even distribution/branch 4-branch optical splitter, assuming that a transmissible distance is L1 [km], equation (10) holds in order that the light output from the ONU arrives with the minimum reception sensitivity of the OLT receiver.

[Math. 10]

$$P_{onu} - A + 10\{\log_{10}(50 \times 50) - 4\} - \alpha L'_1 - B = P_{rec} + \Delta P \quad (10)$$

The transmission distance (L1) of the port 1 in a case that an uneven branch/distribution optical splitter is applied by using equation (4) in equation (9) to express as a function of X is given by equation (11), and the transmission distance (L1) of the port 1 in a case that an even branch/distribution optical splitter is applied using equation (10) and equation (7) can be expressed by equation (12).

[Math. 11]

$$L_1 = \frac{1}{\alpha} \{C + 10(\log_{10} X - 2)\} \quad (11)$$

[Math. 12]

$$L'_1 = \frac{1}{\alpha} \{C + 10(\log_{10} 50 \times 50 - 4)\} \quad (12)$$

Here, assuming that 50<X<100, L1>L1 holds, and it can be seen that the port 1 of the uneven branch/distribution 4-branch optical splitter can extend the transmissible distance than the even branch/distribution 4-branch optical splitter.

As described above, the uneven branch/distribution 4-branch optical splitter 403, in the passive double star PON system, can establish the communication with the all ONUs under the OLT and extend a reach transmission distance of the farmost user connected to the port 1 or increase the number of connectible users by adjusting the branching configuration of the first stage optical splitter or the branching ratios X, Y, and Z such that each of the lights output from the farmost ONU connected under the port 2, the farmost ONU connected under the port 3, and the farmost ONU connected under the port 4 arrives with the optical intensity at the minimum reception sensitivity (in consideration of ΔP depending on circumstances) of the receiver of the OLT.

Note that, in the present embodiment, for convenience of description, the embodiment of the fiber type optical splitter is described, but the same effect can be obtained with a spatial optical splitter using an optical element constituted by a waveguide type optical splitter, a half mirror, a beam splitter, or the like regardless of materials or configurations.

Embodiment 2

Figure 6:
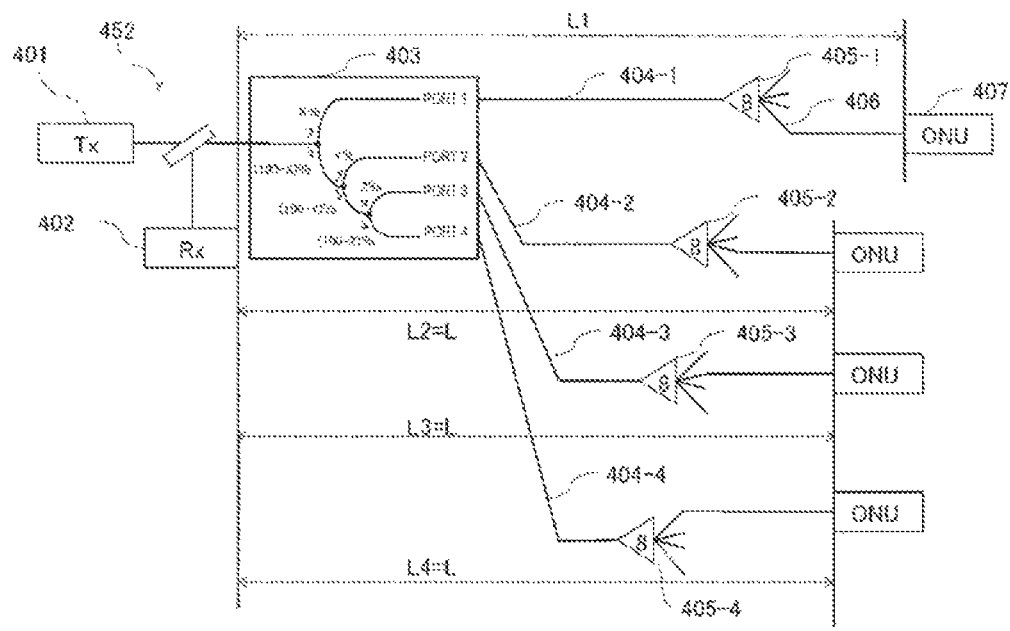
FIG. 6 is a diagram illustrating an optical communication system according to an embodiment of the present disclosure.

FIG. 6 illustrates an optical communication system 452 according to the present embodiment. Reference signs illustrated in the figure are the same as those illustrated in FIG. 5. A difference from Embodiment 1 is that the distances L2, L3, and L4 of the farmost ONUs under the port 2 to the port 4 are the same distances L2=L3=L4. Such events can occur in a case of using a LD having a broad spectral line width such as a Fabry-Perot (FP)-LD for the LD placed on the ONU side, for example. Because the FP-LD oscillates at a wide spectrum width and at multiple wavelengths, differences in a transmission speed due to a wavelength and the effects of wavelength dispersion cause deteriorated reception sensitivity in propagation of long distance. Thus, in order to establish communication, the distance to the ONU needs to be not greater than the maximum transmission distance L [km] that is not affected by the wavelength dispersion.

As expressed in equation (13), the distances of the farmost ONU under the port 2, the farmost ONU under the port 3, and the farmost ONU under the port 4 are L.

[Math. 13]

$$L_2 = L_3 = L_4 = L \quad (13)$$

Substitute equation (13) into equation (5) and equation (6), and uniquely obtain the branching ratios Y and Z:

[Math. 14]

$$Y = 10^2 \left( \frac{10^{\alpha L/10}}{10^{\alpha L/10} + 10^{\alpha L/10} + 10^{\alpha L/10}} \right) = 33\% \qquad (14)$$

[Math. 15]

$$Z = 10^2 \left( \frac{10^{\alpha L/10}}{10^{\alpha L/10} + 10^{\alpha L/10}} \right) = 50\% \qquad (15)$$

Similarly, using equation (4), expressions can be given:

[Math. 16]

$$X = 10^2 [1 - \{10^{(\alpha L - C)/10} + 10^{(\alpha L - C)/10} + 10^{(\alpha L - C)/10}\}] \qquad (16)$$

[Math. 17]

$$= 10^2 [1 - 3 \times 10^{(\alpha L - C)/10}] \qquad (17)$$

and further, the distance L1 to the farmost ONU under the port 1 can be expressed as below using equation (9):

[Math. 18]

$$L_1 = \frac{1}{\alpha} \{C + 10\log_{10}(1 - 3 \times 10^{(\alpha L - C)/10})\} \qquad (18)$$

Compare the equation (18) with the equation (12), which is the transmission distance to the farmost ONU under the port 1 of the even branch/distribution 4-branch optical splitter.

[Math. 19]

$$L_1 - L_1' = \frac{10}{\alpha} \left( 4 + \log_{10} \frac{1 - 3 \times 10^{\frac{\alpha L - C}{10}}}{50 \times 50} \right) \qquad (19)$$

At this time, substitute general values for the respective constants as below: transmissible distance L of FP-LD=10 km;
fiber transmission loss $\alpha$=0.5 [dB/km];
$P_{onu}$=4 [dBm];
$P_{rec}$=−28 [dBm];
$\Delta P$=0.5 [dBm];
A=9 [dB]; and
B=9.1 [dB]
then, L1>L1 is obtained, and it can be seen that the port 1 of the uneven branch/distribution optical splitter 403 can extend the transmissible distance than the output port of the even branch/distribution 4-branch optical splitter 400.

As described above, the uneven branch/distribution 4-branch optical splitter 403, in the passive double star PON system, can establish the communication with the all ONUs under the OLT and extend a reach transmission distance of the farmost user connected to the port 1 or increase the number of connectible users by adjusting the branching ratios X, Y, and Z even under such a condition that the distance of each of the farmost ONU connected under the port 2, the farmost ONU connected under the port 3, and the farmost ONU connected under the port 4 is not greater than a transmission distance limit L [km] caused by the wavelength dispersion of the FP-LD.

Embodiment 3

Figure 7:
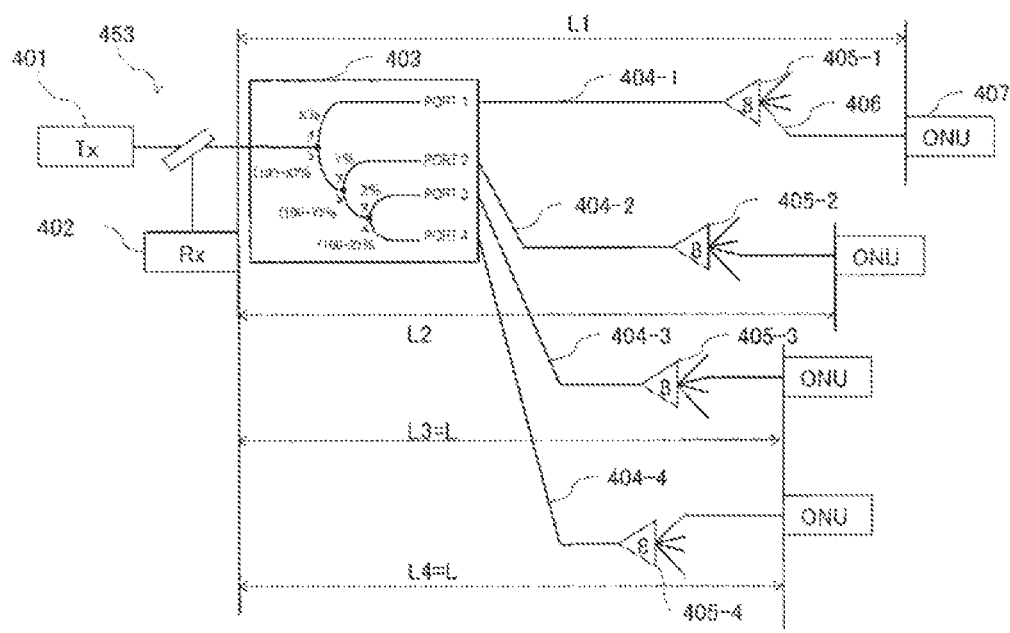
FIG. 7 is a diagram illustrating an optical communication system according to an embodiment of the present disclosure.

FIG. 7 illustrates an optical communication system 453 according to the present embodiment. Reference signs are the same as those illustrated in FIG. 6. A difference from Embodiment 2 is that the distance L2 of the farmost ONU under the port 2 is arbitrary, and the distances L3 and L4 of the farmost ONUs under the port 3 and the port 4 are the same distances L3=L4. The present embodiment can occur in a case that a FP-LD is used for the LD installed on the ONU side of each of the ports 3 and 4.

As expressed in equation (20), the distances of the farmost ONU under the port 3 and the farmost ONU under the port 4 are L.

[Math. 20]

$$L_3 = L_4 = L \qquad (20)$$

Substitute equation (20) into equation (6), and uniquely obtain the branching ratio Z:

[Math. 21]

$$Z = 10^2 \left( \frac{10^{\alpha L/10}}{10^{\alpha L/10} + 10^{\alpha L/10}} \right) = 50\% \qquad (21)$$

Similarly, using equations (4) and (5), expressions can be given:

[Math. 22]

$$X = 10^2 \left( 1 - 10^{\frac{\alpha L_2 - C}{10}} - 2 \times 10^{\frac{\alpha L - C}{10}} \right) \qquad (22)$$

[Math. 23]

$$Y = 10^2 \left( \frac{10^{\alpha L_2/10}}{10^{\alpha L_2/10} + 2 \times 10^{\alpha L/10}} \right), \qquad (23)$$

and further, the distance L1 to the farmost ONU under the port 1 can be expressed as below using equation (9):

[Math. 24]

$$L_1 = \frac{1}{\alpha} \left\{ C + 10\log_{10} \left( 1 - 10^{\frac{\alpha L_2 - C}{10}} - 2 \times 10^{\frac{\alpha L - C}{10}} \right) \right\} \qquad (24)$$

As described above, the uneven branch/distribution 4-branch optical splitter 403, in the passive double star PON system, can establish the communication with the all ONUs under the OLT and extend a reach transmission distance of the farmost user connected to the port 1 or increase the number of connectible users by adjusting the branching ratios X, Y, and Z under such a condition that the distance of each of the farmost ONU connected under the port 3 and the farmost ONU connected under the port 4 is not greater than a transmission distance limit L [km] caused by the wavelength dispersion of the FP-LD.

Fourth Embodiment

Figure 8:
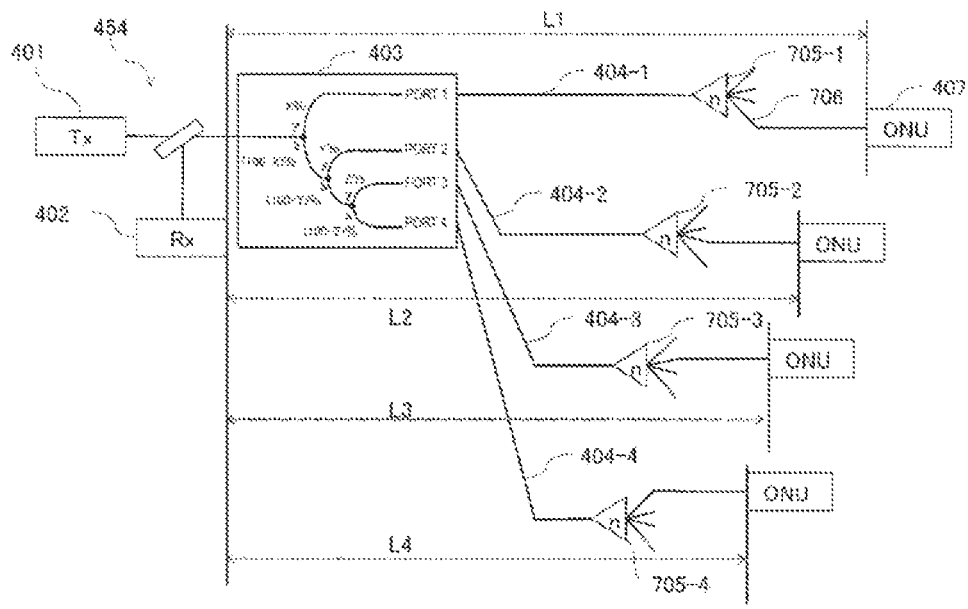
FIG. 8 is a diagram illustrating an optical communication system according to an embodiment of the present disclosure.

FIG. 8 illustrates an optical communication system 454 according to the present embodiment. Reference signs illustrated in the figure are the same as those illustrated in FIG. 5. A difference from previous embodiments is that the number of branches of the second stage n:1 optical splitter is generalized to n (with branching ratio=50%). Reference signs 705-1 to 705-4 denote the second stage n:1 optical splitters; 706, n branched subscriber optical fiber lines, respectively. The branching loss of the n-branch optical splitter can be achieved by a combination of 2-branch optical splitters and the number of branch points is login, and thus, the branching loss is 3×log$_2$n [dB].

The transmission distance L1 of the port 1 in the case that the uneven branch/distribution optical splitter with the first stage m:1 optical splitter (m=4) is expressed by equation (11), the transmission distance L1 of the even branch/distribution 4-branch optical splitter is expressed by equation (12), and equation (7) is replaced into equation (25).

[Math. 25]

$$C = P_{onu} - (P_{rec} + \Delta P) - 3\log_2 n - B \quad (25)$$

As described above, assuming that 50<X<100, L1>L1 molds, and it can be seen that the port 1 of the uneven branch/distribution 4-branch optical splitter 403 can extend the transmissible distance than the even branch/distribution 4-branch optical splitter 400.

As described above, the uneven branch/distribution 4-branch optical splitter 403, in the passive double star PON system, can establish the communication with the all ONUs under the OLT and extend a reach transmission distance of the farmost user connected to the port 1 or increase the number of connectible users by adjusting the branching configuration of the first stage optical splitter or the branching ratios X, Y, and Z such that each of the lights output from the farmost ONU connected under the port 2, the farmost ONU connected under the port 3, and the farmost ONU connected under the port 4 arrives with the minimum reception sensitivity of the receiver of the OLT.

Embodiment 5

The present embodiment will be described using FIGS. 9 and 10.

Figure 9:
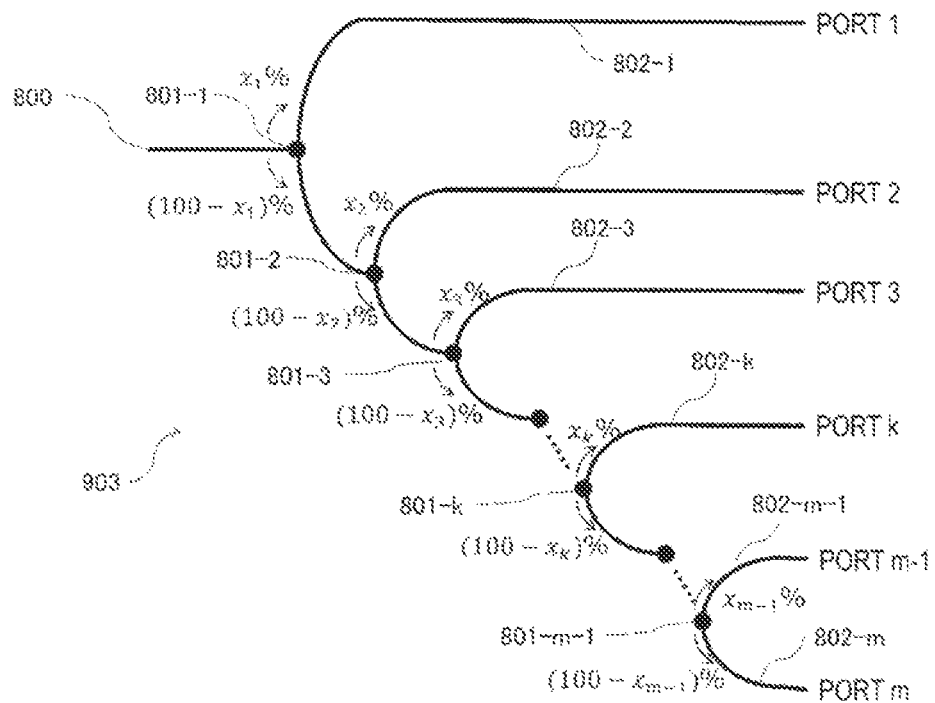
FIG. 9 is a diagram illustrating a configuration of an uneven branch/distribution m-branch optical splitter.

FIG. 9 illustrates an uneven branch/distribution m-branch optical splitter 903, and a reference sign 800 in the figure denotes an input port of a light; 801-1 to 801-$m$-1, branch points (fiber fused and extended points); and 802-1 to 802-$m$, output ports of the uneven branch/distribution m-branch optical splitter. The branching ratios at the branch points 801-1 to 801-$m$-1 are $x_1$:(100-$x_1$)(%) to $x_{m-1}$:(100-$x_{m-1}$)(%), and $x_1$ to $x_{m-1}$ are all greater than 0%.

Figure 10:
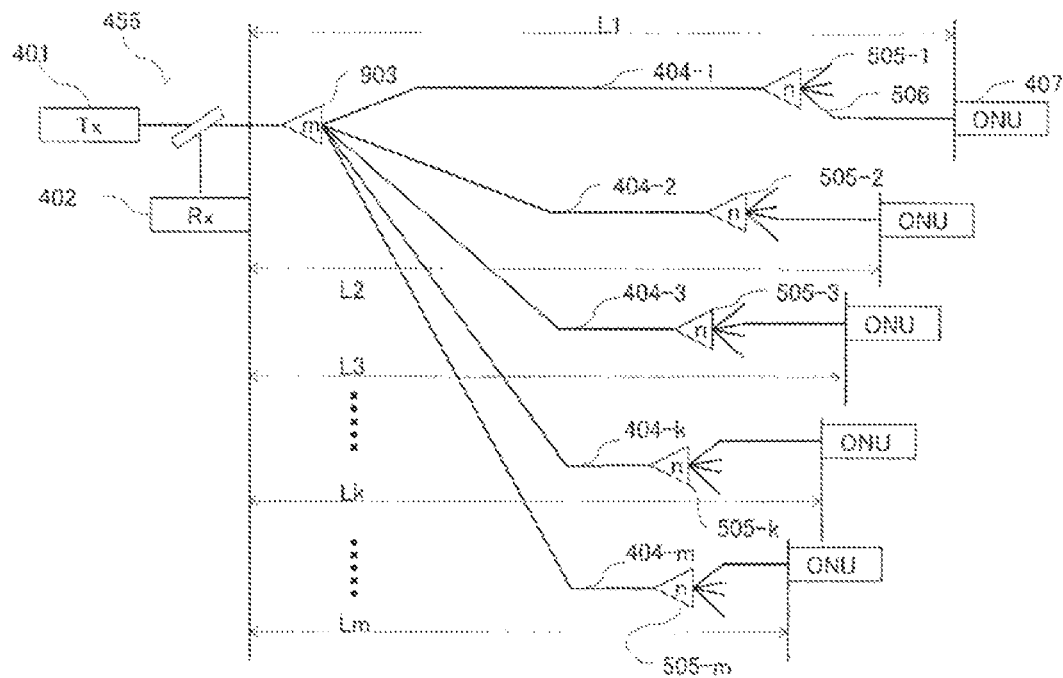
FIG. 10 is a diagram illustrating an optical communication system according to an embodiment of the present disclosure.

An optical communication system is illustrated in FIG. 10 in which an uneven branch/distribution m-branch optical splitter is installed at the first stage, and an even distribution n-branch optical splitter 505 is applied to the second stage. Reference signs illustrated in the figure are the same as those illustrated in FIG. 8. A difference from previous embodiments is that the uneven branch/distribution m-branch optical splitter is installed at a portion denoted by the reference sign 903.

Here, for any integer k satisfying 1≤k≤m-1, assuming that a distance to the farmost ONU under a port k is $L_k$ [km], when a light arrives with the minimum reception sensitivity of the OTL receiver 402, the following equation holds. For the farmost ONUs under the port 2 to the port m-1, an expression can be:

[Math. 26]

$$P_{onu} - 3\log_2 n + 10\left\{\log_{10}\left[\prod_{l=2}^{k-1}(100-x_l)\cdot x_k\right] - 2k\right\} - \alpha L_k - B = \quad (26)$$
$$P_{rec} + \Delta P$$

For the farmost ONU under the port m, an expression can be:

[Math. 27]

$$P_{onu} - 3\log_2 n + 10\left\{\log_{10}\left[\prod_{l=2}^{k}(100-x_l)\right] - 2k\right\} - \alpha L_k - B = \quad (27)$$
$$P_{rec} + \Delta P$$

Equation (26) and Equation (27) are simultaneous linear equations with m-1 unknown for m-1 variables $x_1$ to $x_{m-1}$, which can be solved to be represented by known constants for $x_1$-$x_{m-1}$. For the farmost ONU under the port 1 at this time, the optical intensity can be expressed as below:

[Math. 28]

$$P_{onu} - 3\log_2 n + 10(\log_{10}x_1 - 2) - \alpha L_1 - B = P_{rec} + \Delta P \quad (28)$$

Solve this for L1 to obtain:

[Math. 29]

$$L_1 = \frac{1}{\alpha}\{C - 3\log_2 n + 10(\log_{10}x_1 - 2)\} \quad (29)$$

Here, consider an optical communication system in which an even distribution m-branch optical splitter at the first stage and an even distribution n-branch optical splitter is located at the second stage. When comparing a distance L1" [km] to the farmost ONU in the optical communication system with L1 described above, there is less loss due to a branching portion denoted by 801-1 only, and L1>L1" always holds.

As described above, the uneven branch/distribution m-branch optical splitter 903, in the passive double star PON system, can establish the communication with the all ONUs under the OLT and extend a reach transmission distance of the farmost user connected to the port 1 or increase the number of connectible users by adjusting the branching configuration of the first stage uneven branch/distribution m-branch optical splitter or the branching ratios $x_1$ to $x_{m-1}$ such that each of the lights output from the farmost ONU connected under each of the port 2 to the port m of the first stage optical splitter arrives with the optical intensity at the minimum reception sensitivity (in consideration of ΔP depending on circumstances) of the receiver of the OLT.

Embodiment 6

Figure 11:
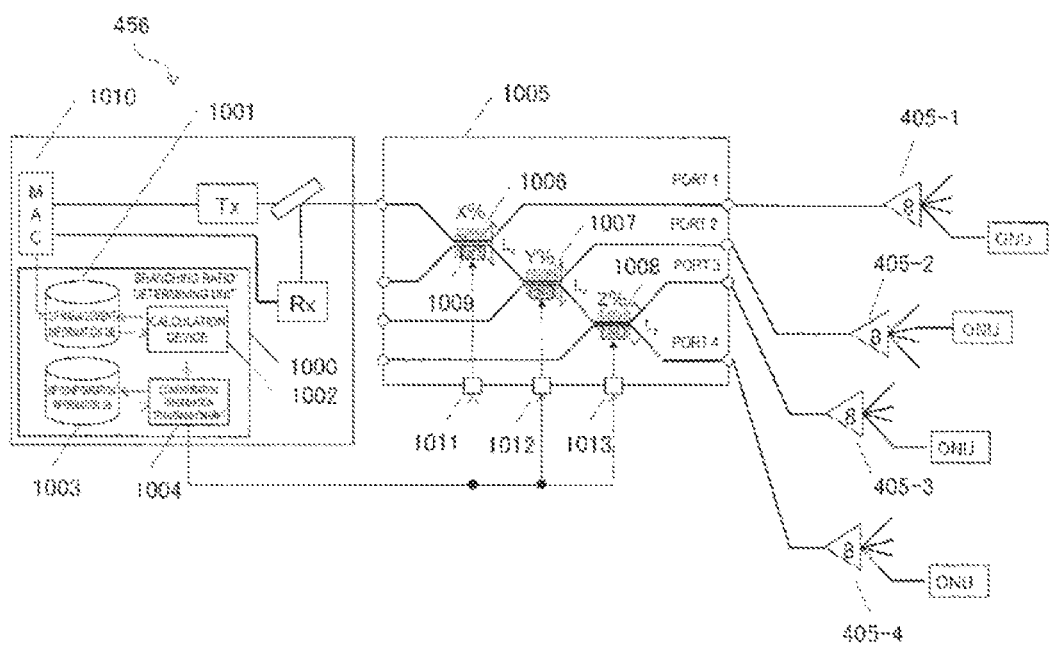
FIG. 11 is a diagram illustrating an optical communication system according to an embodiment of the present disclosure.

FIG. 11 illustrates an optical communication system 456 according to the present embodiment. Some of reference signs illustrated in the figure are the same as those illustrated in FIG. 5. The present embodiment is an example in which the embodiments described above are applied to an optical communication system. In the figure, a reference sign 1000 denotes a branching ratio determining unit; 1001, an optical splitter management information database (SP management information DB); 1002, a calculation device; 1003, a splitter configuration information database (SP configuration information DB); 1004, a configuration information transmission unit; 1005, an m:1 branching ratio variable uneven branch/distribution optical splitter (m=4); 1006 to 1008, fiber core proximity locations; 1009, a drive stage; 1010, a Media Access Control Large Scale Integration (MAC-LSI); and 1011 to 1013, input IFs, respectively. The branching ratio variable uneven branch/distribution optical splitter 1005, in a case of a fiber type described above, for example, can change the branching ratio by bringing the optical fiber cores close to each other to change a coupling efficiency of an evanescent field by distances (Lx, Ly, Lz) between the cores so that the branching ratio can be changed.

As described above, the PON system may measure the distance between the OLT and the ONUs connected thereto by the function called the ranging. The branching ratio determining unit 1000 reads the distance of each of the farmost ONU (distance L2) under the port 2, the farmost ONU (distance L3) under the port 3, and the farmost ONU (distance L4) under the port 4 which are connected from the MAC-LSI 1010 that governs the ranging function, and calculates the branching ratios X, Y, and Z. Then, the branching ratio determining unit 1000 adjusts the fiber core proximity locations (1006 to 1008) of the uneven branch/distribution optical splitter 1005 to be X, Y, and Z on the basis of the calculation result.

A more specific description will be provided.
The branching ratio determining unit 1000 acquires, from the MAC-LSI 1010, the distances of the ONUs connected under the port 2 to port 4, and stores the distances in the SP management information DB 1001. For example, the SP management information DB 1001 has columns of an output port number of the first stage optical splitter (uneven branch/distribution optical splitter 1005), a port number of the second stage optical splitter (even branch/distribution optical splitter 405), a connection state of an ONU connected to a port of the second stage optical splitter, and a corresponding distance as illustrated in a table in FIG. 13.

The calculation device 1002 extracts a value of the farthest distance for each port of the first stage optical splitter from the SP management information DB 1001. For example, extracted are, in the table of FIG. 13, for the port 2, a distance l2 of an ONU connected to a no. 2 port of the second stage optical splitter (where l2 is assumed to be the farthest under the port 2), for the port 3, a distance l4 of an ONU connected to a no. 8 port of the second stage optical splitter (where l2 is assumed to be the farthest under the port 3), and for the port 4, a distance l5 of an ONU connected to a no. 1 port of the second stage optical splitter (where l5 is assumed to be the farthest under the port 4). The calculation device 1002 calculates the extracted L2=l2, L3=l4, L4=l5 using equations (4) to (6) illustrated in Embodiment 1 to determine the branching ratios X, Y, and Z, and inputs the result to the configuration information transmission unit 1004.

The SP configuration information DB 1003 has a table of, for example, a branching ratio, a distance between fiber cores corresponding to the branching ratio (Lx, Ly, Lz), and a voltage value corresponding to the distance between the fiber cores, as illustrated in a table in FIG. 14. The configuration information transmission unit 1004 extracts a corresponding voltage value from the SP configuration information DB 1003 according to the branching ratio X, Y, or Z calculated by the calculation device 1002, and inputs the value to the input IF 1011 to 1013 of the uneven branch/distribution optical splitter 1005. The drive stage 1009 includes, for example, a piezo actuator, and can configure the distances Lx to Lz on the basis of the voltage values input owing to an inverse piezoelectric effect, i.e., can configure the branching ratios X, Y, and Z.

As described above, the optical communication system 456, in the passive double star PON system, can establish the communication with the all ONUs under the OLT and extend a reach transmission distance of the farmost user connected to the port 1 or increase the number of connectible users by automatically adjusting the branching configuration of the uneven branch/distribution 4-branch optical splitter 1005 or the branching ratios X, Y, and Z such that each of the lights output from the farmost ONU connected under the port 2, the farmost ONU connected under the port 3, and the farmost ONU connected under the port 4 arrives with the optical intensity at the minimum reception sensitivity (in consideration of AP depending on circumstances) of the receiver of the OLT.

Note that, in the present embodiment, for convenience of description, it is illustrated that the branching ratio of the variable uneven branch/branch optical splitter 1005 is changed by using the piezo actuator at the drive stage, but the scheme is not limited that described in Embodiment 6, so long as the branching ratios X, Y, and Z are calculated using the farthest distances of the ONUs connected under the port 2 to the port 4 of the variable uneven branch/branch optical splitter 1005 by a ranging function of the MAC-LSI, and the calculation result is fed back to the uneven branch/distribution optical splitter, and thereby, X, Y, and Z can be automatically configured. Moreover, the number m of branches of the first stage m:1 uneven branch/distribution splitter is assumed as m=4, the number n of branches of the second stage n:1 even branch optical splitter is assumed as n=8, but the number of branches of the first or second stage optical splitter is not limited by applying the generalized equations illustrated in Embodiment 5 to calculate the branching ratios X, Y, and Z.

Other Embodiments

In the embodiments described above, for convenience, the passive double star type is described in which the optical line termination (OLT) installed on the accommodating station side and the optical network unit (ONU) installed on the home side are connected via two optical splitters, but the present invention is not limited thereto.

Figures 12, 13:
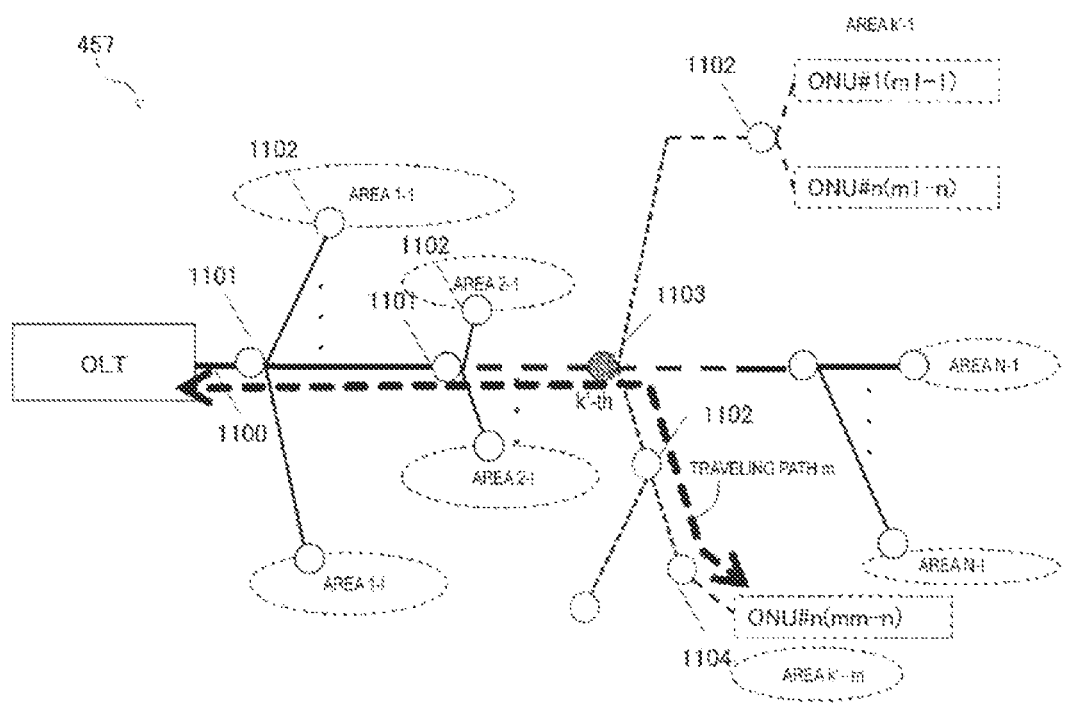
FIG. 12 is a diagram illustrating an optical communication system according to an embodiment of the present disclosure.
FIG. 13 is a diagram illustrating a table stored in an optical splitter management information database included in the optical communication system according to an embodiment of the present disclosure.

FIG. 12 illustrates a passive optical network 457 in which the OLT and the ONUs are connected via a plurality of optical splitters. A reference sign 1100 in the figure denotes a trunk optical fiber connected to the accommodating station; 1101, an even branch/distribution j:1 optical splitter; 1102, an even branch/distribution n:1 optical splitter; 1103, the k-th uneven branch/distribution m:1 optical splitter connected to the truck optical fiber; and 1104, the o-th even branch/distributor n:1 optical splitter connected under the k-th output port m, respectively.

Specifically, the passive optical network 457 is an optical communication system in which one OLT and a plurality of ONUs are connected via two or more optical splitters, wherein the optical splitters include
at least one trunk optical splitter (the even branch/distribution j:1 optical splitter 1101, the uneven branch/distribution m:1 optical splitter 1103) located in the trunk optical fiber 1100 connected to the OLT,
a plurality of branch optical splitters (the even branch/distribution n:1 optical splitter (1102, 1104)) located on branch optical fibers branched from the trunk optical fiber by the at least one trunk optical splitter, and a trunk end optical splitter (the even branch/distribution n:1 optical splitter 1105) located at a far end of the trunk optical fiber 1100 when viewed from the OLT, one of the at least one trunk optical splitter is an uneven branch optical splitter (the uneven branch/distribution m:1 optical splitter 1103) that branches a light from one wave coupling port on a wave coupling side to a plurality of branch ports on a branching side at a predetermined branching ratio, a branch port, where the number of branch points from the wave coupling port to the branch port is minimum, among the branch ports of the uneven branch optical splitter is connected to the trunk optical fiber 1100, and the branch optical splitters, the trunk end optical splitter, and the others of the at least one trunk optical splitters are even branch optical splitters (the even branch/distribution j:1 optical splitter 1101, the even branch/distribution n:1 optical splitter (1102, 1104)) each of which equally branches a light from one wave coupling port on the wave coupling side to a plurality of branch ports on the branching side.

In order to determine the branching ratio of the uneven branch/distribution m:1 optical splitter 1103 installed the k-th, the branching ratios may be determined such that the output optical intensity of each of the farmost ONU connected under the output port 1, the farmost ONU connected under the port 2, and the farmost ONU connected under the port m of the uneven branch/distribution m:1 optical splitter 1103 illustrated in Embodiment 5 is the minimum reception sensitivity when arriving at the OLT. In other words, among k+o optical splitters on a traveling path m in the figure, if the number of uneven branch/distribution optical splitters is "1" and the number of even branch/distribution optical splitters is (k+o−1), the branching ratios can be determined in accordance with the embodiments described above to enable the longer haul distance of the trunk optical fiber compared to a passive optical network in which all optical splitters are even branch/distribution optical splitters, without being limited to the network topology configuration.

APPENDIX

PTL 1 describes an uneven branch type optical splitter, but PTL 1 is an invention for solving the problem of manufacturing a device, and is not applied to an optical communication system and an optical communication system. In other words, the cited document 1 is not a document disclosing that in the passive double star PON system, a reach transmission distance of the farmost user can be extended or the number of connectible users can be increased by adjusting the branching configuration of the first stage optical splitter or the branching ratios such that the near minimum reception sensitivity is given for the ONU installed near the telecommunications carrier.

REFERENCE SIGNS LIST

100 Telecommunications carrier station
101 Optical line termination (OLT)
102 m:1 optical splitter
103 Primary subscriber optical fiber line
104 n:1 optical splitter
105 Branched subscriber optical fiber line
106-1 to 106-n Optical network unit (ONU)
310, 320 Input port
311 to 313, 321 to 323 Branch point (fiber fused and extended point)
314-1 to 314-4, 324-1 to 324-4 Output port
400 Even branch/distribution 4-branch optical splitter
401 Transmitter
402 Receiver
403 Uneven branch/distribution 4-branch optical splitter
404-1 to 404-4 Primary subscriber optical fiber line (404-1 is trunk optical fiber)
405-1 to 405-4 Second stage n:1 optical splitter (n=8)
406 Branched subscriber optical fiber line
407 ONU
451 to 457 Optical communication system
505 Even distribution n-branch optical splitter
800 Input port
801-1 to 801-m−1 Branch point (fiber fused and extended point)
802-1 to 802-m Output port
903 Uneven branch/distribution m-branch optical splitter
1000 Branching ratio determining unit
1001 Optical splitter management information database
1002 Calculation device
1003 Splitter configuration information database
1004 Configuration information transmission unit
1005 m:1 branching ratio variable uneven branch/distribution optical splitter (m=4)
1006 to 1008 Fiber core proximity location
1009 Drive stage
1010 MAC-LSI
1011 to 1013 Input IF
1100 Trunk optical fiber
1101 Even branch/distribution j:1 optical splitter
1102 Even branch/distribution n:1 optical splitter
1103 Uneven branch/distribution m:1 optical splitter
1104 Even branch/distribution n:1 optical splitter

The invention claimed is:

1. An optical communication system comprising one OLT and a plurality of ONUs connected via two or more optical splitters,
wherein the optical splitters include:
at least one trunk optical splitter located in a trunk optical fiber connected to the OLT,
a plurality of branch optical splitters located on branch optical fibers branched from the trunk optical fiber by the at least one trunk optical splitter, and
a trunk end optical splitter located at a far end of the trunk optical fiber when viewed from the OLT,
one of the at least one trunk optical splitter is an uneven branch optical splitter that branches a light from one wave coupling port on a wave coupling side to a plurality of branch ports on a branching side at a predetermined branching ratio,
a branch port, where the number of branch points from the wave coupling port to the branch port is minimum, among the branch ports of the uneven branch optical splitter is connected to the trunk optical fiber, and
the branch optical splitters, the trunk end optical splitter, and the others of the at least one trunk optical splitters are even branch optical splitters each of which equally branches a light from one wave coupling port on the wave coupling side to a plurality of branch ports on the branching side
wherein the uneven branch optical splitter is configured with the predetermined branching ratio for each of the branch optical splitters connected to the branch ports of the uneven branch optical splitter via the branch optical fibers such that a light from a farmost ONU that is the farthest from the OLT, among the ONUs under the branch optical splitter, arrives at the OLT with an optical intensity at a minimum reception sensitivity or more of the OLT.

2. The optical communication system according to claim 1,
wherein the at least one trunk optical splitter is only one trunk optical splitter, which is located the nearest to the OLT and on the trunk optical fiber, the number of branch ports of the only one trunk optical splitter is m (m is an integer of 2 or greater),
a branch port, where the number of branch points from the wave coupling port to the branch port is minimum, among the branch ports of the uneven branch optical splitter that is the only one trunk optical splitter is connected to a wave coupling port of the trunk end optical splitter having branch ports the number of which is n (n is an integer of 2 or greater),
the number of the branch optical splitters is m−1, and other than the branch port, where the number of branch points from the wave coupling port to the branch port is minimum, among the branch ports of the uneven branch optical splitter that is the only one trunk optical splitter, a wave coupling port of the branch optical splitter having branch ports the number of which is n (n is an integer of 2 or greater) is connected, and
the optical communication system is a passive double star optical communication system.

3. The optical communication system according to claim 1,
wherein the uneven branch optical splitter has a variable mechanism that changes the branching ratio with a control signal, and
the optical communication system further comprises a branching ratio determining unit including:
a calculation device configured to calculate the branching ratio of the uneven branch optical splitter based on a distance to the farmost ONU for each branch optical splitter, the distance being measured by a ranging function of the OLT, and
a configuration information transmission unit configured to notify the uneven branch optical splitter, through the control signal, of the branching ratio calculated by the calculation device as the predetermined branching ratio.

4. The optical communication system according to claim 1,
wherein the at least one trunk optical splitter is only one trunk optical splitter, which is located the nearest to the OLT and on the trunk optical fiber, the number of branch ports of the only one trunk optical splitter is m (m is an integer of 2 or greater),
a branch port, where the number of branch points from the wave coupling port to the branch port is minimum, among the branch ports of the uneven branch optical splitter that is the only one trunk optical splitter is connected to a wave coupling port of the trunk end optical splitter having branch ports the number of which is n (n is an integer of 2 or greater),
the number of the branch optical splitters is m−1, and other than the branch port, where the number of branch points from the wave coupling port to the branch port is minimum, among the branch ports of the uneven branch optical splitter that is the only one trunk optical splitter, a wave coupling port of the branch optical splitter having branch ports the number of which is n (n is an integer of 2 or greater) is connected, and
the optical communication system is a passive double star optical communication system.

5. An optical communication method in an optical communication system in which one OLT and a plurality of ONUs are connected via at least one trunk optical splitter located on a trunk optical fiber connected to the OLT, the optical communication method comprising:
using the one trunk optical splitter as an uneven branch optical splitter that branches a light from one wave coupling port on a wave coupling side to a plurality of branch ports on a branching side at a predetermined branching ratio, and connecting a branch port, where the number of branch points from the wave coupling port to the branch port is minimum, among the branch ports of the uneven branch optical splitter to a farmost ONU
wherein the uneven branch optical splitter is configured with the predetermined branching ratio for each of the branch optical splitters connected to the branch ports of the uneven branch optical splitter via the branch optical fibers such that a light from a farmost ONU that is the farthest from the OLT, among the ONUs under the branch optical splitter, arrives at the OLT with an optical intensity at a minimum reception sensitivity or more of the OLT.

6. The optical communication method according to claim 5, further comprising:
a calculation procedure calculating the branching ratio of the uneven branch optical splitter based on a distance to the farmost ONU for each branch optical splitter, the distance being measured by a ranging function of the OLT;
a configuration information transmission procedure notifying the uneven branch optical splitter, through a control signal, of the branching ratio calculated in the calculation procedure as the predetermined branching ratio; and
a branching ratio changing procedure changing the branching ratio of the uneven branch optical splitter using the control signal notified in the configuration information transmission procedure.

7. An optical communication system comprising one OLT and a plurality of ONUs connected via two or more optical splitters,
wherein the optical splitters include:
at least one trunk optical splitter located in a trunk optical fiber connected to the OLT,
a plurality of branch optical splitters located on branch optical fibers branched from the trunk optical fiber by the at least one trunk optical splitter, and
a trunk end optical splitter located at a far end of the trunk optical fiber when viewed from the OLT,
one of the at least one trunk optical splitter is an uneven branch optical splitter that branches a light from one wave coupling port on a wave coupling side to a plurality of branch ports on a branching side at a predetermined branching ratio,
a branch port, where the number of branch points from the wave coupling port to the branch port is minimum, among the branch ports of the uneven branch optical splitter is connected to the trunk optical fiber, and
the branch optical splitters, the trunk end optical splitter, and the others of the at least one trunk optical splitters are even branch optical splitters each of which equally branches a light from one wave coupling port on the wave coupling side to a plurality of branch ports on the branching side wherein the uneven branch optical splitter has a variable mechanism that changes the branching ratio with a control signal, and the optical communication system further comprises a branching ratio determining unit including:

a calculation device configured to calculate the branching ratio of the uneven branch optical splitter based on a distance to the farmost ONU for each branch optical splitter, the distance being measured by a ranging function of the OLT, and a configuration information transmission unit configured to notify the uneven branch optical splitter, through the control signal, of the branching ratio calculated by the calculation device as the predetermined branching ratio.

8. An optical communication method in an optical communication system in which one OLT and a plurality of ONUs are connected via at least one trunk optical splitter located on a trunk optical fiber connected to the OLT, the optical communication method comprising:

using the one trunk optical splitter as an uneven branch optical splitter that branches a light from one wave coupling port on a wave coupling side to a plurality of branch ports on a branching side at a predetermined branching ratio, and connecting a branch port, where the number of branch points from the wave coupling port to the branch port is minimum, among the branch ports of the uneven branch optical splitter to a farmost ONU;

calculating the branching ratio of the uneven branch optical splitter based on a distance to the farmost ONU for each branch optical splitter, the distance being measured by a ranging function of the OLT;

notifying the uneven branch optical splitter, through a control signal, of the branching ratio calculated in the calculation procedure as the predetermined branching ratio; and changing the branching ratio of the uneven branch optical splitter using the control signal notified in the configuration information transmission procedure.

* * * * *